(12) United States Patent
Mazzella

(10) Patent No.: US 11,059,606 B2
(45) Date of Patent: Jul. 13, 2021

(54) AIRCRAFT DEICING FLUID RECOVERY SYSTEM

(71) Applicant: John Mazzella, Bronx, NY (US)

(72) Inventor: John Mazzella, Bronx, NY (US)

(*) Notice: Subject to any disclaimer, the term of this patent is extended or adjusted under 35 U.S.C. 154(b) by 700 days.

(21) Appl. No.: 15/954,936

(22) Filed: Apr. 17, 2018

(65) Prior Publication Data

US 2019/0315490 A1 Oct. 17, 2019

(51) Int. Cl.
*B64F 5/23* (2017.01)
*B60P 3/22* (2006.01)
*B05B 14/00* (2018.01)
*B60P 3/30* (2006.01)

(52) U.S. Cl.
CPC ............ *B64F 5/23* (2017.01); *B05B 14/00* (2018.02); *B60P 3/2205* (2013.01); *B60P 3/225* (2013.01); *B60P 3/228* (2013.01); *B60P 3/30* (2013.01)

(58) Field of Classification Search
CPC .......... B64F 5/23; B60P 3/225; B60P 3/2205; B60P 3/228; B60P 3/30; B05B 14/00; B05B 1/207
See application file for complete search history.

(56) References Cited

U.S. PATENT DOCUMENTS

| | | | | |
|---|---|---|---|---|
| 3,533,395 A | * | 10/1970 | Yaste | B64F 5/20 126/271.1 |
| 5,318,254 A | * | 6/1994 | Shaw | B25J 5/005 239/135 |
| 5,458,299 A | * | 10/1995 | Collins | B64F 5/23 244/134 C |
| 5,462,655 A | * | 10/1995 | Ladd | C02F 1/441 210/167.01 |
| 5,857,646 A | * | 1/1999 | Taricco | B64F 5/20 244/134 R |
| 5,904,321 A | | 5/1999 | Cox et al. | |
| 6,820,841 B2 | | 11/2004 | Mittereder et al. | |
| 2017/0267617 A1 | * | 9/2017 | Lepine | C07C 29/80 |

* cited by examiner

*Primary Examiner* — Valentina Xavier
(74) *Attorney, Agent, or Firm* — Carter, DeLuca & Farrell LLP

(57) ABSTRACT

A deicing fluid recovery system includes a vehicle movable adjacent to an aircraft and including a holding tank configured to store deicing fluid and a receptacle configured to capture deicing fluid from the aircraft during a deicing procedure. During the deicing procedure, deicing fluid runoff from a surface of the aircraft may be captured into the receptacle and transferred from the receptacle into the holding tank. The deicing fluid runoff may be captured into the receptacle before the deicing fluid runoff contacts ground.

20 Claims, 4 Drawing Sheets

AIRCRAFT DEICING FLUID RECOVERY SYSTEM

TECHNICAL FIELD

The present disclosure relates to fluid recovery systems, and more particularly, to deicing fluid recovery systems for aircrafts and methods of use thereof.

BACKGROUND

In inclement weather conditions (e.g., snow, freezing precipitation, etc.), ice formation on the wings and fuselage of an aircraft can reduce aircraft performance as well as increase the risk of an accident. Deicing of aircraft is commonly performed in both commercial and general aviation prior to takeoff. Typically, the wings and fuselage of an aircraft are sprayed with deicing fluid to remove or prevent the buildup of ice on the wings and fuselage. After application of the deicing fluid to the wings and fuselage, the deicing fluid runs off the wings and fuselage and onto the ground surface below the aircraft. Disposing of deicing fluid on the ground surface can be potentially hazardous to the environment. Moreover, deicing fluid can be expensive, thus increasing costs.

Accordingly, a need exists for an aircraft deicing fluid recovery system and methods of use thereof that reduce environmental risk and minimize costs.

SUMMARY

According to an aspect of the present disclosure, a deicing fluid recovery system is provided, including a vehicle movable adjacent to an aircraft. The vehicle includes a holding tank configured to store deicing fluid and a receptacle configured to capture deicing fluid from the aircraft during a deicing procedure and transfer the deicing fluid into the holding tank, such that deicing fluid runoff from the aircraft is captured into the receptacle before the deicing fluid runoff contacts ground.

In embodiments, a boom lift may be provided and may be movable from a first position to a second position relative to the vehicle. The boom lift may have a first end portion secured to the vehicle, and a second, articulating end portion secured to the receptacle. Movement of the second, articulating end portion of the boom lift may cause a corresponding movement of the receptacle.

In some embodiments, a pump may be provided having a first port and a second port. The second port may be in fluid communication with the holding tank. A fluid line may be provided having a first end portion and a second end portion. The first end portion of the fluid line may be in fluid communication with the receptacle and the second end portion of the fluid line may be in fluid communication with the first port of the pump. The pump may be configured to suction, through the fluid line, deicing fluid from the receptacle into the holding tank. The pump may be configured to discharge deicing fluid from the holding tank into the receptacle.

In certain embodiments, the receptacle includes a spray ring having a plurality of nozzles. The first end portion of the fluid line may be in fluid communication with the spray ring.

In embodiments, a second tank may be provided and may be in fluid communication with the holding tank. The second tank may be configured to receive deicing fluid from the holding tank.

In some embodiments, a second pump may be provided including an inlet port and an outlet port. The inlet port of the second pump may be in fluid communication with the holding tank and the second tank. A discharge line may be provided having a first end portion and a second end portion. The first end portion of the discharge line may be in fluid communication with the outlet port of the second pump and the second end portion of the discharge line may be in fluid communication with a spray ring of the receptacle having a plurality of nozzles. The inlet port of the pump may be configured to suction deicing fluid from the second tank and the outlet port of the second pump may be configured to discharge deicing fluid, through the discharge line into the spray ring, and through the plurality of nozzles.

In certain embodiments, the receptacle may define an inner surface and an outer surface and may have a drain defined through the respective inner and outer surfaces.

In embodiments, the inner surface of the receptacle may include at least one of barbs, spikes, and protrusions.

In some embodiments, the receptacle may include at least one of a filter and a mesh disposed over the drain.

In certain embodiments, the inner surface of the receptacle may include at least one sensor configured to detect at least one of an overflow and an obstruction in the receptacle.

In embodiments, the sensor may be selected from the group consisting of passive infrared, microwave, magnetic reed-switch floats, solid state electro optical, and visual level indicators.

In some embodiments, the receptacle is formed from a material selected from the group consisting of metal, ceramic, plastic, polymer, wood, and composite.

In certain embodiments, the receptacle may define a semi-spherical shape and may have a flange extending outwardly from a perimeter thereof. The flange may be configured to enlarge a surface area of the receptacle for capturing deicing fluid.

In embodiments, the vehicle is selected from the group consisting of a car, truck, ATV, airport ground support vehicle, automated guided vehicle, and utility vehicle.

According to another aspect of the present disclosure, a method for recovering deicing fluid during an aircraft deicing procedure is provided, including spraying an aircraft with deicing fluid, positioning a vehicle and a receptacle of the vehicle under a location of deicing fluid runoff from the aircraft and capturing the deicing fluid runoff into the receptacle before the deicing fluid runoff contacts ground.

In embodiments, the method may include pumping deicing fluid from the receptacle through a fluid line into a holding tank, the holding tank being secured to the vehicle.

In some embodiments the method may include pumping deicing fluid from the holding tank into the receptacle.

In certain embodiments, the method may include spraying deicing fluid into a spray ring of the receptacle and through a plurality of nozzles disposed on an inner surface of the receptacle to clear an obstruction within the receptacle.

In embodiments, the method may include activating a boom lift of the vehicle, the boom lift having a first end portion secured to the vehicle, and a second, articulating end portion secured to the receptacle, and moving the second, articulating end of the boom lift to cause a corresponding movement of the receptacle.

In some embodiments, the method may include repositioning the vehicle if a location of the deicing fluid runoff from the aircraft has changed.

BRIEF DESCRIPTION OF THE DRAWINGS

Objects and features of the present disclosure will become apparent to those of ordinary skill in the art when descriptions thereof are read with reference to the accompanying drawings, of which.

DETAILED DESCRIPTION

Figure 1:
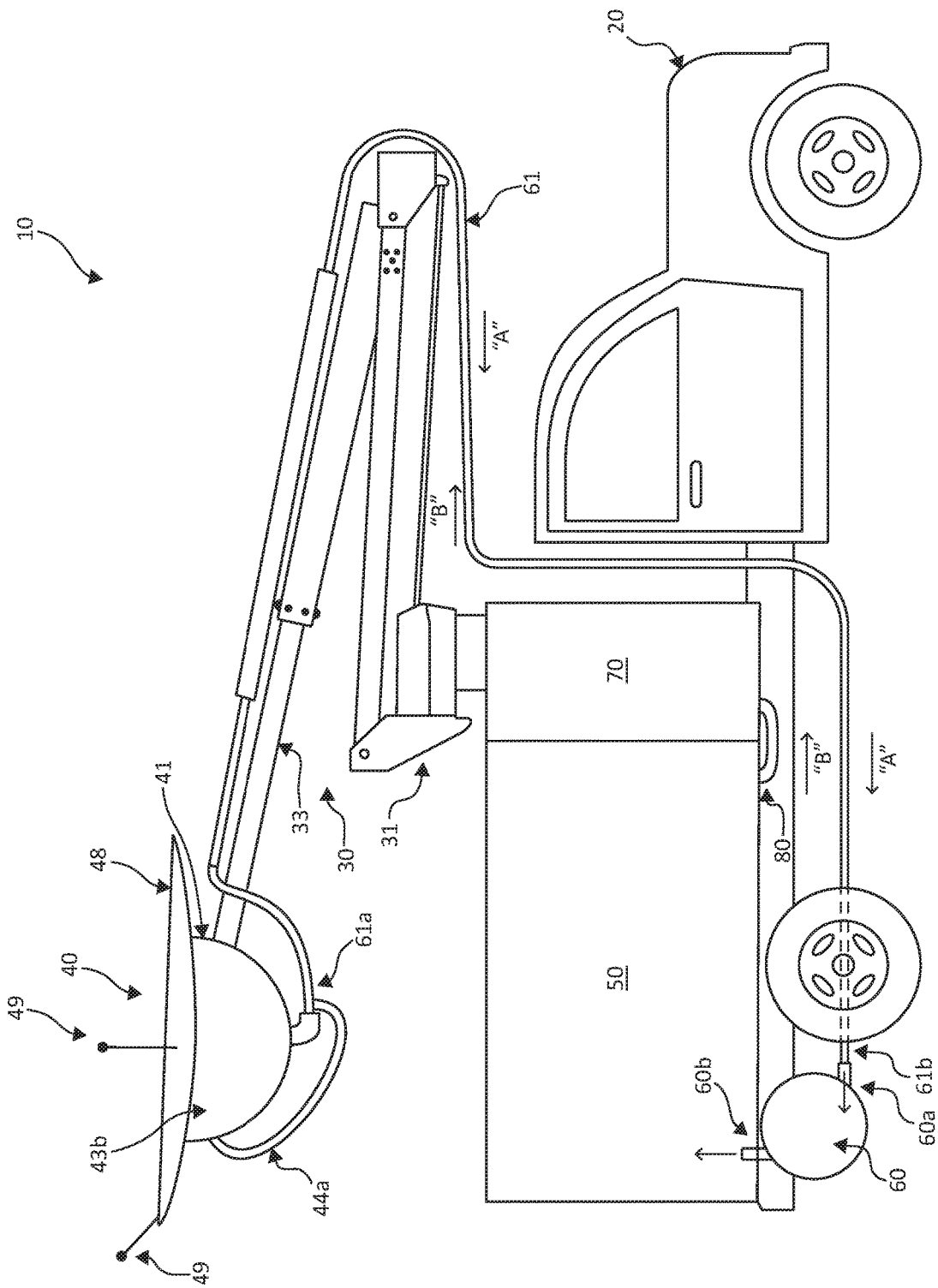
FIG. 1 is a side view of a deicing fluid recovery system in accordance with the present disclosure.

Embodiments of the present disclosure are described in detail with reference to the drawings in which like reference numerals designate identical or corresponding elements in each of the several views. In the following description, well-known functions or constructions are not described in detail to avoid obscuring the present disclosure in unnecessary detail.

The presently disclosed deicing fluid recovery system includes a vehicle with a receptacle configured for recovering deicing fluid from a surface of an aircraft (e.g., a wing, fuselage, etc.) in a deicing procedure, and a holding tank for storing the deicing fluid. As deicing fluid is applied to the aircraft during a deicing procedure, the vehicle with the receptacle secured thereto is positioned adjacent the aircraft such that deicing fluid runoff from the aircraft is collected in the receptacle and stored in the holding tank of the vehicle. The deicing fluid is recaptured directly from the surface of the aircraft before contacting, e.g., the runway or ground surface. As a result, the deicing fluid is unsoiled before entering the holding tank. The stored deicing fluid can then be reused.

Figure 2:
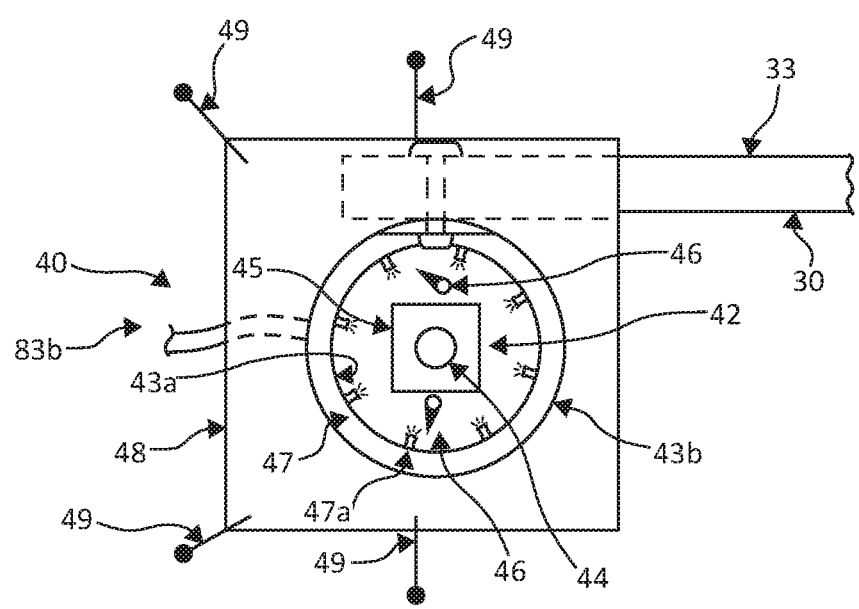
FIG. 2 is a top view of a receptacle of the deicing fluid recovery system of FIG. 1.

Referring initially to FIGS. 1 and 2, deicing fluid recovery system 10 generally includes a vehicle 20, a boom lift 30, a receptacle 40, a holding tank 50, a pump 60, and a second tank 70.

Vehicle 20 may be any type of vehicle such as a car, truck, ATV, airport ground support vehicle, automated guided vehicle, utility vehicle, etc. Vehicle 20 is movable adjacent (e.g., under, around, above, next to, etc.) any part of an aircraft. Vehicle 20 may have one or more control panels (not shown) for operating any of the components of deicing fluid recovery system 10 described below.

Boom lift 30 includes a first end portion 31 mounted to vehicle 20 and a second end portion 33 that includes receptacle 40, as will be described below. Boom lift 30 is movable (e.g., telescopable, articulatable, etc.) from a first position to a second position relative to vehicle 20 for positioning boom lift 30 adjacent to any surface of an aircraft. Boom lift 30 supports receptacle 40 such that movement of boom lift 30 causes a corresponding movement of receptacle 40, as will be described below.

Receptacle 40 is secured to second end portion 33 of boom lift 30 and is configured for receiving (e.g., capturing) deicing fluid from a surface of an aircraft (e.g., wings, fuselage, etc.) during a deicing procedure. It is also contemplated that receptacle 40 may be mounted directly to vehicle 20. Receptacle 40 generally includes a body 41 having an opening 42, an inner surface 43a, an outer surface 43b, and a drain 44. Receptacle 40 may be any type of fluid receiving and/or containing device, such as a basin, sink, bucket, funnel, container, or the like. Drain 44 of receptacle 40 is in fluid communication with a first end portion 61a of a fluid line 61, as described below. Second end portion 61b of fluid line 61 is connected to a pump 60 for pumping or drawing the captured deicing fluid from receptacle 40 into holding tank 50 and/or second tank 70, and for pumping or discharging deicing fluid from holding tank 50 and/or second tank 70 into receptacle 40, as will be described below.

In some embodiments, receptacle 40 may include a flange 48 extending from a surface thereof configured to increase the surface area of receptacle 40 for capturing deicing fluid. In certain embodiments, receptacle 40 may be formed of any suitable shape or combination of shapes, such as a conical, semi-spherical, rectangular, trapezoidal, etc. In yet other embodiments, receptacle 40 may be formed of any suitable material, such as metal, ceramic, plastic, polymers, wood, composites, and/or combinations thereof. In some embodiments, receptacle 40 may include a mesh or filter 45 that is disposed over drain 44 and that is configured to prevent debris from entering or clogging drain 44.

In embodiments, inner surface 43a of receptacle 40 may include one or more protrusions 46 (e.g., barbs, spikes, etc.), configured to break down ice chunks as they are received or fall into receptacle 40 during an aircraft deicing procedure. In embodiments, receptacle 40 includes a spray ring 47. Spray ring 47 of receptacle 40 is configured to receive deicing fluid from holding tank 50 and/or second tank 70 via a transfer line 44a that is connected to first end portion 61a of fluid line 61. In embodiments, transfer line 44a may include a valve (not explicitly shown) that opens when pump 60 is discharging deicing fluid into receptacle 40 and closes when pump 60 is suctioning deicing fluid from receptacle 40. Spray ring 47 is in fluid communication with one or more nozzles 47a that are disposed on spray ring 47. Nozzles 47a of spray ring 47 are configured to spray deicing fluid (e.g., at high-pressure) into opening 42 of receptacle 40, e.g., for melting/breaking down any ice chunks/obstructions that are received into receptacle 40 that can potentially block or clog drain 44 during a deicing procedure.

In further embodiments, receptacle 40 may include one or more sensors 49. Sensors 49 may be disposed on any surface of receptacle 40 (e.g., inner surface 43a, outer surface 43b, etc.), or in proximity to receptacle 40. Sensors 49 may be used to detect an obstruction within receptacle 40, such as large ice chunks or debris. Likewise, sensors 49 may be used to detect an obstruction outside of receptacle 40. For example, sensors 49 can alert a user (e.g., visual and/or auditory cues) when receptacle 40 is too close to the aircraft to prevent contact of receptacle 40 with the aircraft. In embodiments, sensors 49 may be used to detect or measure fluid flow into receptacle 40. Sensors 49 may be any suitable type of sensor or switch such as, passive infrared, proximity, contact, microwave, magnetic reed-switch based floats, solid-state electro-optical, visual level indicators, or the like.

Holding tank 50 is secured to vehicle 20 and is configured for storing deicing fluid. Pump 60 is configured to operate in a suction mode and a discharge mode. In suction mode, pump 60 is configured to draw deicing fluid from receptacle 40 into holding tank 50 and/or second tank 70, as indicated by direction arrow "A." In discharge mode, pump 60 is configured to discharge deicing fluid from holding tank 50 and/or second tank 70 into receptacle 40, as indicated by direction arrow "B." Pump 60 includes a first port 60a and a second port 60b. First port 60a of pump 60 is in fluid communication with a second end portion 61b of fluid line 61. Second port 60b of pump 60 is in fluid communication with holding tank 50 (and second tank 70 via crossover line 80). In embodiments, pump 60 can be any type of pump, such as a hydraulic pump. It is contemplated that receptacle 40 may be connected directly to holding tank 50 such that fluid received within receptacle 40 during a deicing procedure is transferred (e.g., flows) directly into holding tank 50, e.g., via gravity.

Second tank 70 is in fluid communication with holding tank 50 via crossover line 80. As such, in suction mode, pump 60 draws deicing fluid from receptacle 40 into either holding tank 50 and/or second tank 70. In discharge mode, pump 60 discharges deicing fluid from either holding tank 50 and/or second tank 70 into receptacle 40, e.g., to clear obstructions or blockages within receptacle 40, as described above.

Figure 3:
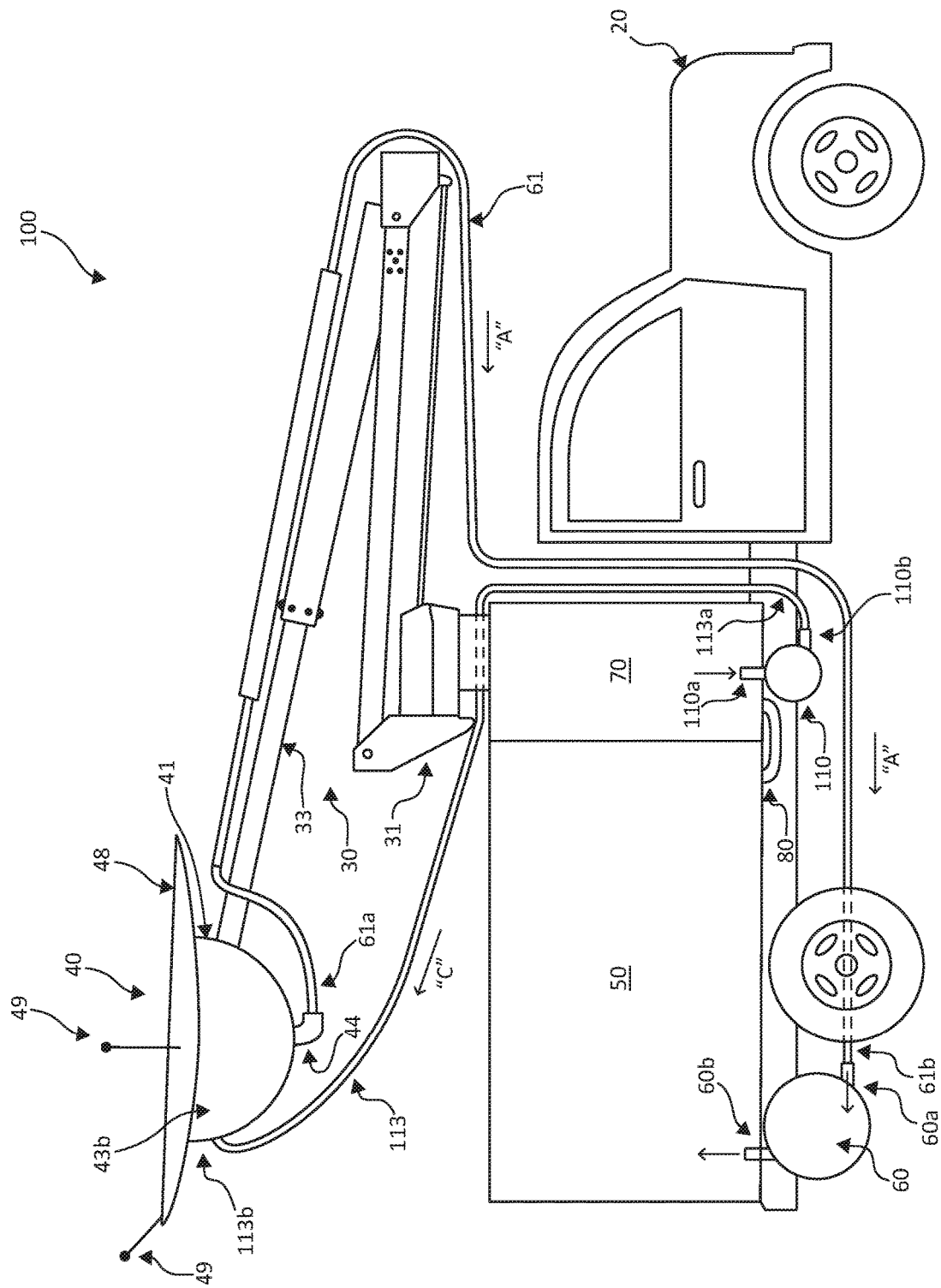
FIG. 3 is a side view of another embodiment of a deicing fluid recovery system in accordance with the present disclosure.

Turning now to FIG. 3, an alternative embodiment of a deicing fluid recovery system is shown and is generally designated as 100. Since the operation of deicing fluid recovery system 100 is similar to deicing fluid recovery system 10, deicing fluid recovery system 100 will only be described as necessary to demonstrate apparent differences.

Deicing fluid recovery system 100 includes a second pump 110 and a discharge line 113 having a first end portion 113a and a second end portion 113b. Second pump 110 is configured to draw deicing fluid from second tank 70 (and/or holding tank 50 via crossover line 80) and discharge the deicing fluid into receptacle 40, as indicated by direction arrow "C." Second pump 110 includes an inlet port 110a and an outlet port 110b. The inlet port 110a of second pump 110 is in fluid communication with second tank 70 (and holding tank 50 via crossover line 80). The outlet port 110b of second pump 110 is in fluid communication with first end portion 113a of discharge line 113. Second end portion 113b of discharge line 113 is connected to spray ring 47 of receptacle 40.

Spray ring 47 of receptacle 40 is configured to receive deicing fluid from second tank 70 (and holding tank 50 via crossover line 80) via second end portion 113b of discharge line 113. Spray ring 47 is in fluid communication with one or more nozzles 47a that are configured to receive deicing fluid from spray ring 47 and spray high-pressure deicing fluid into opening 42 of receptacle 40 to facilitate, e.g., melting or breaking down of ice chunks or obstructions that can potentially block or clog drain 44 of receptacle 40.

Figure 4:
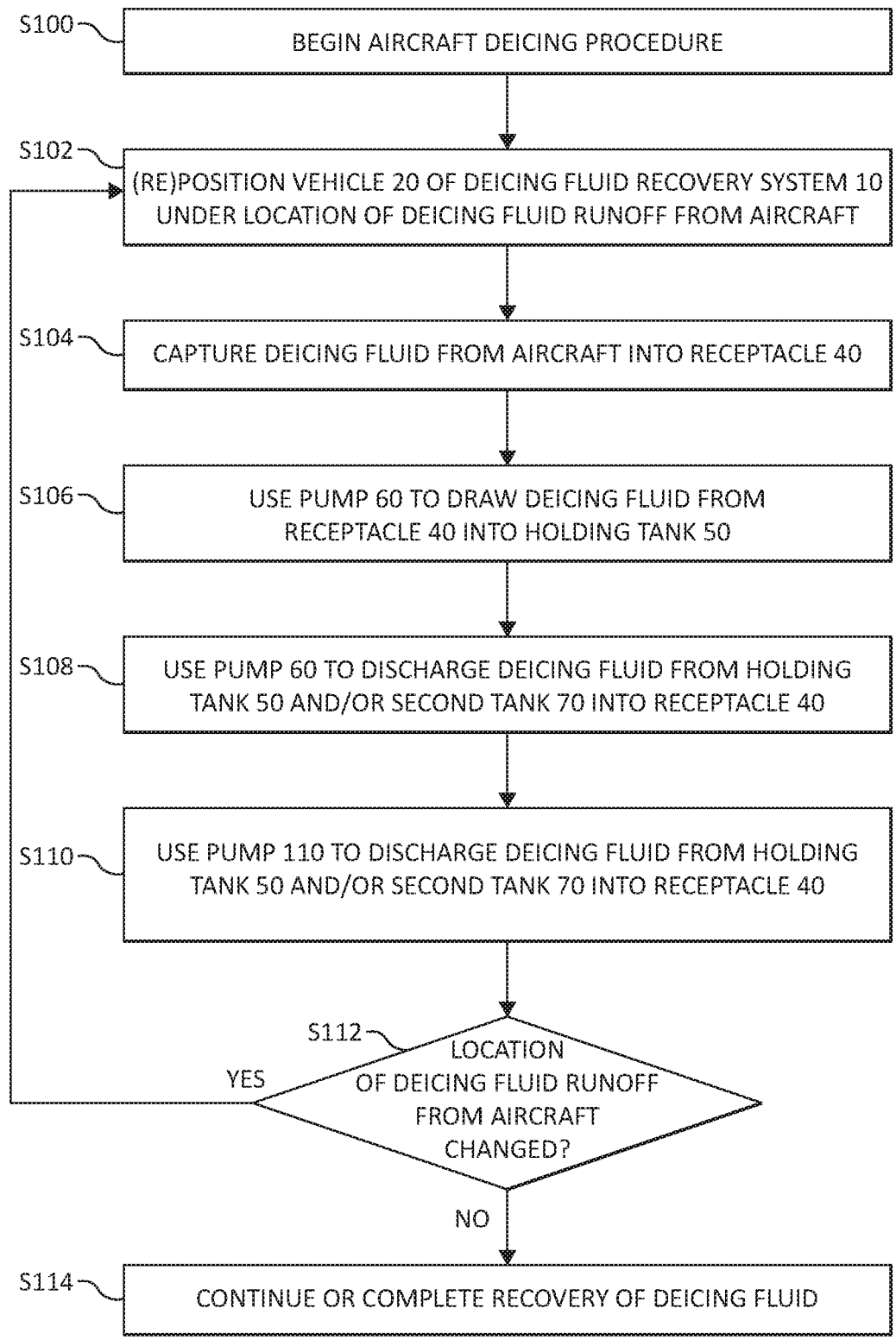
FIG. 4 is a flowchart illustrating an example method of collecting deicing fluid from an aircraft in a deicing procedure using the deicing fluid recovery systems of FIGS. 1 and 3.

Referring now to FIG. 4, a method in accordance with the present disclosure is described. The method of FIG. 3, although necessarily illustrated and described in an order, is not intended to have any limiting effect or to imply any particular order. To this end, the methods illustrated and described herein may include some or all of the features described and may be implemented in any suitable order.

In use, in S100, an aircraft is sprayed with deicing fluid to begin the deicing procedure. In S102, vehicle 20 is positioned adjacent to the aircraft and boom lift 30 is positioned such that receptacle 40 is placed under the location of deicing fluid runoff. In S104, the deicing fluid is captured in receptacle 40. In S106, in suction mode, pump 60 then begins to suction or draw the deicing fluid from receptacle 40 through fluid line 61. Specifically, deicing fluid is suctioned from drain 44 of receptacle 40, through first end portion 61a of fluid line 61 to second end portion 61b of fluid line 61, and into first port 60a of pump 60. Second port 60b of pump 60 then sends the captured deicing fluid into holding tank 50 (and second tank 70 via crossover line 80), such that the deicing fluid may be stored or reused.

In S108, in discharge mode, pump 60 discharges deicing fluid from holding tank 50 and/or second tank 70, through fluid line 61 and transfer line 44a, and into spray ring 47 of receptacle 40. Nozzles 47a of spray ring 47 spray the captured deicing fluid from holding tank 50 and/or second tank 70 at high-pressure into opening 42 of receptacle 40, e.g., for melting/breaking down any ice chunks/obstructions that that may have accumulated within receptacle 40.

In S110, in embodiments using deicing fluid recovery system 100, second pump 110 draws or pumps deicing fluid from holding tank 50 and/or second tank 70 into receptacle 40. Outlet port 110b of second pump 110 sends fluid through discharge line 113 into spray ring 47 of receptacle 40 and through one or more nozzles 47a of receptacle 40. The nozzle(s) 47a spray the captured deicing fluid from second tank 70 into receptacle 40 (e.g. at high pressure) to facilitate breaking down of any ice chunks that may have accumulated within receptacle 40. The deicing fluid may be sent back into holding tank 50 and/or second tank 70 using pump 60 in suction mode.

If the deicing fluid runoff location has changed position along the aircraft, in S112, the position of vehicle 20, boom lift 30, and receptacle 40 may be correspondingly modified such that the deicing fluid runoff from the aircraft is captured in receptacle 40. In any of aforementioned steps, sensors 49 can be used to detect an obstruction inside or outside of receptacle 40, and/or an overflow within receptacle 40, and can correspondingly alert a user with a visual and/or auditory cue.

In S114, once the deicing procedure is completed, vehicle 20 may be driven to a secondary location to transfer the captured deicing fluid from holding tank 50 and/or second tank 70 into another storage unit or location for storage and/or reuse. Alternatively, the captured deicing fluid may be kept in holding tank 50 and/or second tank 70 until holding tank 50 and/or second tank 70 have been filled.

It is envisioned that deicing fluid recovery system 10 and deicing fluid recovery system 100 may include any number of valves (not explicitly shown) that may be used, e.g., for cleaning, filling, emptying, etc. holding tank 50 and second tank 70, or for opening and closing the lines connected to pump 60 and/or second pump 110. Likewise, it is envisioned that more than one deicing fluid recovery systems 10 and/or deicing fluid recovery systems 100 may be used during a deicing procedure. It is also contemplated that any number, type, size, length, etc., of tanks, pumps, and fluid lines may be used with deicing fluid recovery system 10 and/or deicing fluid recovery system 100.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. A deicing fluid recovery system, comprising:
a vehicle movable adjacent to an aircraft, the vehicle including:
a holding tank configured to store deicing fluid; and
a receptacle configured to capture deicing fluid from the aircraft during a deicing procedure and transfer the deicing fluid into the holding tank, such that deicing fluid runoff from the aircraft is captured into the receptacle before the deicing fluid runoff contacts ground;
a pump having a first port and a second port, the second port in fluid communication with the holding tank; and
a fluid line having a first end portion and a second end portion, the first end portion of the fluid line in fluid communication with the receptacle, the second end portion of the fluid line in fluid communication with the first port of the pump, wherein the pump is configured to suction, through the fluid line, deicing fluid from the receptacle into the holding tank, and wherein the pump is configured to discharge deicing fluid from the holding tank into the receptacle.

2. The deicing fluid recovery system according to claim 1, further comprising a boom lift movable from a first position to a second position relative to the vehicle, the boom lift having a first end portion secured to the vehicle, and a second, articulating end portion secured to the receptacle, wherein movement of the second, articulating end portion of the boom lift causes a corresponding movement of the receptacle.

3. The deicing fluid recovery system according to claim 1, wherein the receptacle includes a spray ring having a plurality of nozzles, and wherein the first end portion of the fluid line is in fluid communication with the spray ring.

4. The deicing fluid recovery system according to claim 1, further comprising a second tank in fluid communication with the holding tank, the second tank configured to receive deicing fluid from the holding tank.

5. The deicing fluid recovery system according to claim 4, further comprising:
a second pump including an inlet port and an outlet port, the inlet port of the second pump in fluid communication with the holding tank and the second tank; and
a discharge line having a first end portion and a second end portion, the first end portion of the discharge line in fluid communication with the outlet port of the second pump, the second end portion of the discharge line in fluid communication with a spray ring of the receptacle, the spray ring having a plurality of nozzles, wherein the inlet port of the second pump is configured to suction deicing fluid from the second tank, and wherein the outlet port of the second pump is configured to discharge deicing fluid, through the discharge line into the spray ring, and through the plurality of nozzles of the receptacle.

6. The deicing fluid recovery system according to claim 1, wherein the receptacle defines an inner surface and an outer surface, the receptacle having a drain defined through the respective inner and outer surfaces.

7. The deicing fluid recovery system according to claim 6, wherein the inner surface of the receptacle includes at least one of barbs, spikes, or protrusions.

8. The deicing fluid recovery system according to claim 6, wherein the receptacle includes at least one of a filter or a mesh disposed over the drain.

9. The deicing fluid recovery system according to claim 1, wherein the receptacle includes at least one sensor configured to detect at least one of an overflow within the receptacle, an obstruction inside of the receptacle, or an obstruction outside of the receptacle.

10. The deicing fluid recovery system according to claim 9, wherein the sensor is selected from the group consisting of passive infrared, proximity, contact, microwave, magnetic reed-switch floats, solid state electro optical, and visual level indicators.

11. The deicing fluid recovery system according to claim 1, wherein the receptacle is formed from a material selected from the group consisting of metal, ceramic, plastic, polymer, wood, and composite.

12. The deicing fluid recovery system according to claim 1, wherein the receptacle defines a semi-spherical shape, the receptacle having a flange extending outwardly from a perimeter thereof, the flange configured to enlarge a surface area of the receptacle for capturing deicing fluid.

13. The deicing fluid recovery system according to claim 1, wherein the vehicle is selected from the group consisting of a car, truck, ATV, airport ground support vehicle, automated guided vehicle, and utility vehicle.

14. A deicing fluid recovery system, comprising:
a vehicle movable adjacent to an aircraft, the vehicle including:
a holding tank configured to store deicing fluid; and
a receptacle configured to capture deicing fluid from the aircraft during a deicing procedure and transfer the deicing fluid into the holding tank, such that deicing fluid runoff from the aircraft is captured into the receptacle before the deicing fluid runoff contacts ground; and
a boom lift movable from a first position to a second position relative to the vehicle, the boom lift having a first end portion secured to the vehicle, and a second, articulating end portion secured to the receptacle, wherein movement of the second, articulating end portion of the boom lift causes a corresponding movement of the receptacle.

15. The deicing fluid recovery system according to claim 14, wherein the receptacle defines an inner surface and an outer surface, the receptacle having a drain defined through the respective inner and outer surfaces.

16. The deicing fluid recovery system according to claim 15, wherein the inner surface of the receptacle includes at least one of barbs, spikes, or protrusions.

17. The deicing fluid recovery system according to claim 15, wherein the receptacle includes at least one of a filter or a mesh disposed over the drain.

18. The deicing fluid recovery system according to claim 14, wherein the receptacle includes at least one sensor configured to detect at least one of an overflow within the receptacle, an obstruction inside of the receptacle, or an obstruction outside of the receptacle.

19. The deicing fluid recovery system according to claim 14, further comprising a pump in fluid communication with the holding tank.

20. The deicing fluid recovery system according to claim 19, wherein the pump is configured to discharge deicing fluid from the holding tank into the receptacle.

* * * * *